Sept. 8, 1925.

H. J. J. M. DE R. DE BELLESCIZE 1,552,829

RADIO RECEIVING SYSTEM

Filed Aug. 29, 1921     4 Sheets—Sheet 1

Inventor
H.J.J.M.De R. De BELLESCIZE
By his Attorney

Patented Sept. 8, 1925.

1,552,829

UNITED STATES PATENT OFFICE.

HENRI JEAN JOSEPH MARIE DE REGNAULD DE BELLESCIZE, OF TOULON, FRANCE.

RADIO RECEIVING SYSTEM.

Application filed August 29, 1921. Serial No. 496,538.

(GRANTED UNDER THE PROVISIONS OF THE ACT OF MARCH 3, 1921, 41 STAT. L., 1313.)

*To all whom it may concern:*

Be it known that I, HENRI J. J. M. DE REGNAULD DE BELLESCIZE, a citizen of France, and a resident of Toulon, France, have invented certain new and useful Improvements in Radio Receiving Systems (for which I have filed applications in France June 6, 1920, August 7, 1920 and August 13, 1920), of which the following is a specification, accompanied by drawings.

The present invention relates to the reducing of disturbing influences in wireless telegraph and telephone receivers.

Most of the arrangements by which such elimination of atmospheric disturbances may be effected, may be classified in the following categories:

(*a*) Arrangements based on the resonance. The disturbances to be eliminated have an aperiodic character, while the signals to be received are composed of series of oscillations that have a well defined period. The amplitude of the signal is strengthened with respect to that of the disturbance, by causing both energizations to operate one circuit (or a succession of circuits) tuned to the period of the signal. The amplitude of the vibrations that are due to the energizations caused by the signal waves, is increased with respect to that of the atmospheric effects.

(*b*) Arrangements for modifying the total effect of the disturbance with respect to the total effect of the signal (by total effect is meant; quantities of electricity that would be put to work after the oscillations are rectified in the detector). Among the arrangements belonging to this category the following might be cited as an example:

(1) The combinations based on the use of a limiting arrangement, in which the two types of oscillations, signal and atmospheric, collected by the antenna, are transmitted to the receiver through a limiting valve, which permits passage only of amplitudes of a certain given maximum value. The amplitude of the oscillations produced by a signal being inferior to this maximum, these oscillations are integrally transmitted to the receiver and the amplitude of the atmospherics being superior to this maximum, the oscillations produced by the latter are transmitted with a reduced value.

(2) Those systems which utilize a balancing effect, in which the signal and the atmospheric actuate two groups of circuits, one tuned to the oscillation period of low frequency signal and the other detuned. After detection, each one of the currents emanating from these two groups of circuits acts in a differential manner on the indicator. The atmospheric give rise to a substantially like current in each one of the two groups of circuits and has a zero effect on the indicator, while the signal has the opposite effect.

None of these arrangements presents a satisfactory and practical solution of the problem. The effect of the arrangement that is based on the resonance is limited by the transmitting conditions. The amplitude of the current produced by the signal cannot be increased relatively to the amplitude of the dampened trains generated by the atmospheric beyond a certain relation which is a function of the wave length and the sending speed $g$. Researches made by me show that what will be hereinafter referred to as the attenuation coefficient $x_m$, is inversely proportional to the product of these two given values;

$$x_m = \frac{k}{\lambda g}$$

For instance, for a wave of 20,000 m. and a speed of 100 words per minute, $x_m$ is only 500 if the Morse alphabet is used.

It is impossible, therefore, to fight against atmospherics having a high amplitude which is superior to the amplitude that is the product of the amplitude of the signal and attenuation coefficient.

Furthermore, if we take into consideration the quantities of electricity that are put to work and which, after detection, regulate the relative influence of the atmospheric and the signal, it will be readily seen that these quantities of electricity are not modified by the operation of the resonance.

The arrangements affecting the total effect of the received waves, the present application including only those above mentioned and which comprise one or a plurality of elements (valve, detector) having a non-linear effect, and deforming the received oscillations, make possible the use of arrangements based on the resonance, to reduce the relative value of the atmospheric effect, no matter what the comparative value of its initial amplitude with respect to that of the signal is. But these arrangements have the serious disadvantage that they permit the existence of a considerable residual atmospheric, and desensitize the receiving during the whole duration of an atmospheric. If this duration is considerable with respect to that of the signal, the signal may be considerably deformed or even suppressed. It should be noted at this point that the disturbance caused by this momentary desensitization due to an atmospheric is the more serious, the greater the wave length and the sending speed, and the more highly developed the syntony. These are the very characteristics of large modern stations. On the other hand, if the disturbance is not an aperiodic impulse of atmospheric origin, but is caused by another signal than the one to be received and is of sufficient strength to actuate the arrangement, the receiving will be permanently suppressed.

Specifically, it has been proposed to eliminate the trouble caused by atmospheric disturbances in wireless telegraph receiving by limiting to a certain maximum value the amplitude of the oscillations in the circuits which constitute the seat of these disturbances. For this purpose, an amplitude limiting device was inserted between the resonators provided for the selection of the signals to be received and the listening or registering apparatus. This limiting apparatus is usually composed of a three-electrode tube regulated in the neighborhood of its saturation point.

This arrangement has several drawbacks:

The first drawback is due to the circumstance that the characteristics of even those tubes that are best adapted to serve for this limiting purpose, do not permit the formation of a sharp bend in the characteristic curve, their curve having the form illustrated in Fig. 1, where the plate current $i$ in respect to the potential of the grid $v$ is indicated for a given temperature of filament and plate voltage. The tube is regulated to an operating point M so as to give a sufficient inclination to the tangent TT, either to amplify or at least not to weaken the signals. Between values $V_0$ and $V_1$ (for which the tangent becomes horizontal in such a manner that the limitation of amplitude will be perfect there for an alternation) there is a potential difference $V_1-V_0$ which is greater than the one resulting from a signal of normal intensity. As a result of this, the limiting apparatus arrests only the objectionable disturbances the amplitude of which is superior to that of the signals. In the limiting circuits thus far employed, the registering arrangement is not protected against disturbances having an amplitude inferior to $V_1-V_0$.

By locating the limiting apparatus after the resonators, two additional defects will be produced. First, the resonance phenomena increases the amplitude of the signal and brings it up to near that of the disturbances. Due to this, when the amplitude of the disturbances is damped, one runs the risk of damping at the same time the amplitude of the signals. Furthermore, the very short atmospheric disturbances, the only ones that may cause disturbing inductive effects, generate in the resonators freely damped trains the duration of which is much greater. This duration is determined by the time constants of the resonators and covers a fraction of the signal, the length of which is in direct proportion with the wave length and the operating speed. The limiting arrangements of the prior art could therefore be of no use for great distances and rapid sending.

The method forming the object of the present invention is constituted by the combination of two of the above described types of arrangements for eliminating the atmospherics in the receiver. This combination is arranged in accordance with certain conditions to be hereinafter defined and the effect of which is the attenuation of the defects of both arrangements. The combination makes possible the best receiving of signals stripped of the harmful atmospherics.

In the drawings in which like reference numerals designate like parts throughout the various views.

Figure 1:
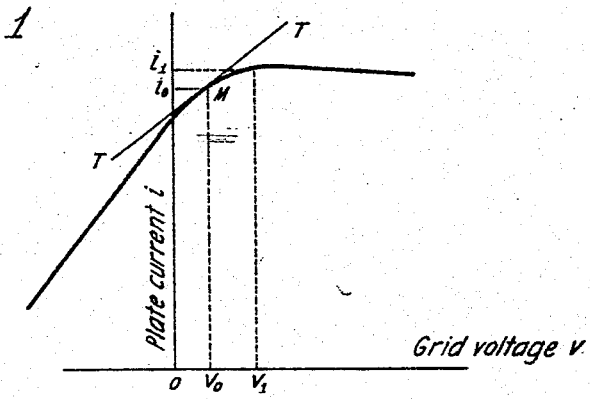
Fig. 1 is a graphic illustration of certain of the characteristics of the tubes of the current limiting device.

Generally speaking, in accordance with the present invention, no matter which one of the arrangements of the various above mentioned categories is used, a receiver will be constructed in accordance with the following rules:

A certain relative attenuation $x_m$ being permitted by traffic conditions (wave length and sending speed), it is divided into two parts; a first portion $x_1$ is absorbed by the establishment of the syntony which is necessary for the proper functioning of the limiting arrangement. This syntony is established only for the purpose of the continuous or slightly damped grinders, and it is brought about in such a manner that $X_1$ be as weak as possible. This makes possible the simultaneous reduction of the duration of the disturbance trains ahead of or within the limiting apparatus and the increasing of their amplitude relatively to that of the signal. The remaining fraction $x_2 = X_m - X_1$ is therefore the maximum. It may be used in its entirety in the resonators placed after the limiting apparatus for the attenuation of the residual defects that escaped this apparatus.

1. The apparatus comprises a limiting apparatus provided for the purpose of reducing the total effect of the disturbances with respect to the total effect of the signal to be received. By total effect is meant the current which would be obtained by the total rectification of the oscillations. Necessarily, the limiting apparatus itself comprises one or a plurality of elements (valve, detectors . . .) that deform the received oscillations.

2. The antenna and the resonators preceeding or constituting the limiting apparatus, are individually highly damped but are so constituted as to attain the necessary syntony. This damping is within the limits 0.2 and 0.5, instead of having the value 0.02 as is the case in usual circuits. A sufficient number of resonators is provided in series to obtain the desired selection, notwithstanding the damping.

The object of this arrangement is to use to the best advantage the selecting mechanism comprising a plurality of resonators of equal frequency connected in cascade. This mechanism may be of very different constructions, depending on whether we have to do with a continuous signal or an aperiodic disturbance. A continuous atmospheric preserves its individual frequency in all the resonators connected in cascade, each resonator acting as though it was standing alone. On the other hand, an aperiodic shock is transformed in the first resonator into a freely damped train characterized by the period and decrement of this resonator, and is only imperfectly eliminated in the next resonator. Two apparently contradictory conditions are proposed: On one hand, it is important that a general syntony be established for insuring the functioning of the limiting apparatus and for protecting it against the permanent action of the grinders; on the other hand, the atmospheric train is reduced in duration and increased in relative amplitude in the same limiting arrangement. The construction of the previously mentioned mechanism permits the conciliation of these two points of view, by multiplying the number of the resonators and individually increasing the damping.

3. The limiting apparatus is followed by a small number of resonators having a very high time constant. Whenever practicable, the best results are obtained with a single resonator, the time constant of which is as great as the speed of sending permits. This resonator may be replaced by a mechanical apparatus, e. g. a registering galvanometer.

These resonators serve as fly wheels and increase the potential of the signal whereby it will dominate the residual atmospheric.

4. Detectors are provided for transforming the high frequency current into modulated current and the latter into direct current. The selection of the tuning of the resonator systems is independent of the method of practising the invention and is determined exclusively by other considerations.

5. The provision of a limiting arrangement for the amplitude of the disturbances, as well in the sense of the increasing potentials as decreasing potentials. The arrangement is furthermore adapted to limit disturbances the amplitude of which is only slightly superior to that of the signal.

6. The use of this limiting arrangement in a manner to avoid the above mentioned drawbacks.

Figure 2:
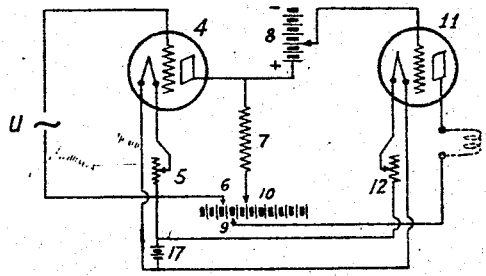
Fig. 2 is a diagrammatic representation of the circuit arrangement of the current limiting device.
Figure 3:
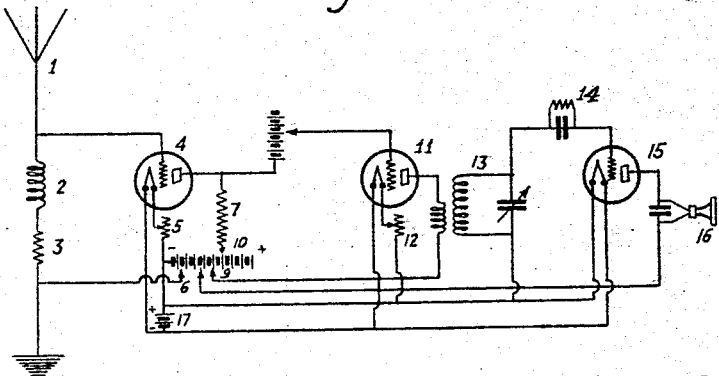
Fig. 3 is a diagrammatic representation of a circuit arrangement comprising a current limiting device interposed between an antenna and a detector circuit.
Figure 4:
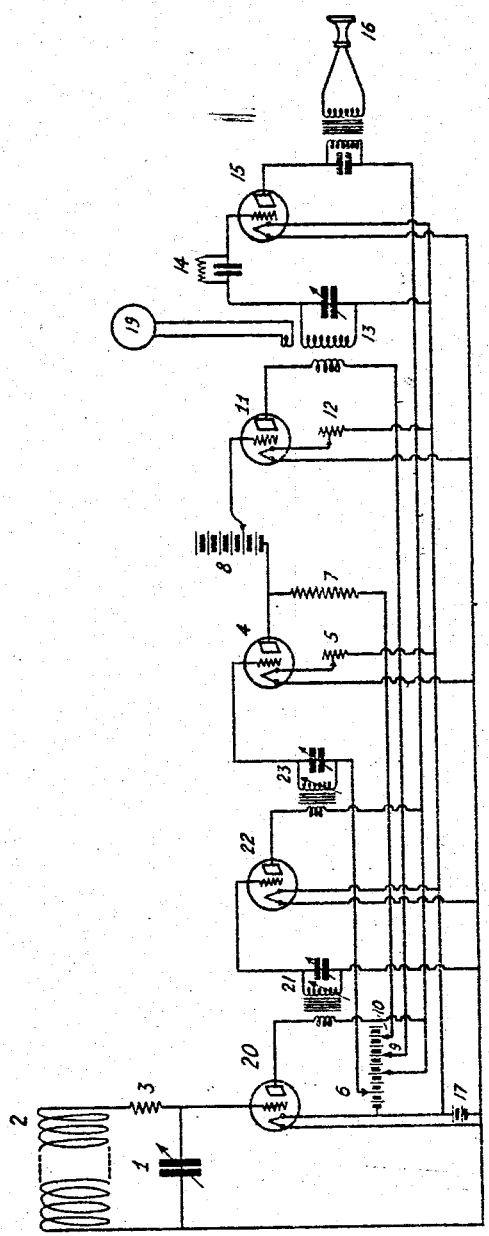
Fig. 4 is a diagrammatic representation of the circuit arrangement of a radio receiving apparatus including a current limiting device.
Figure 5:
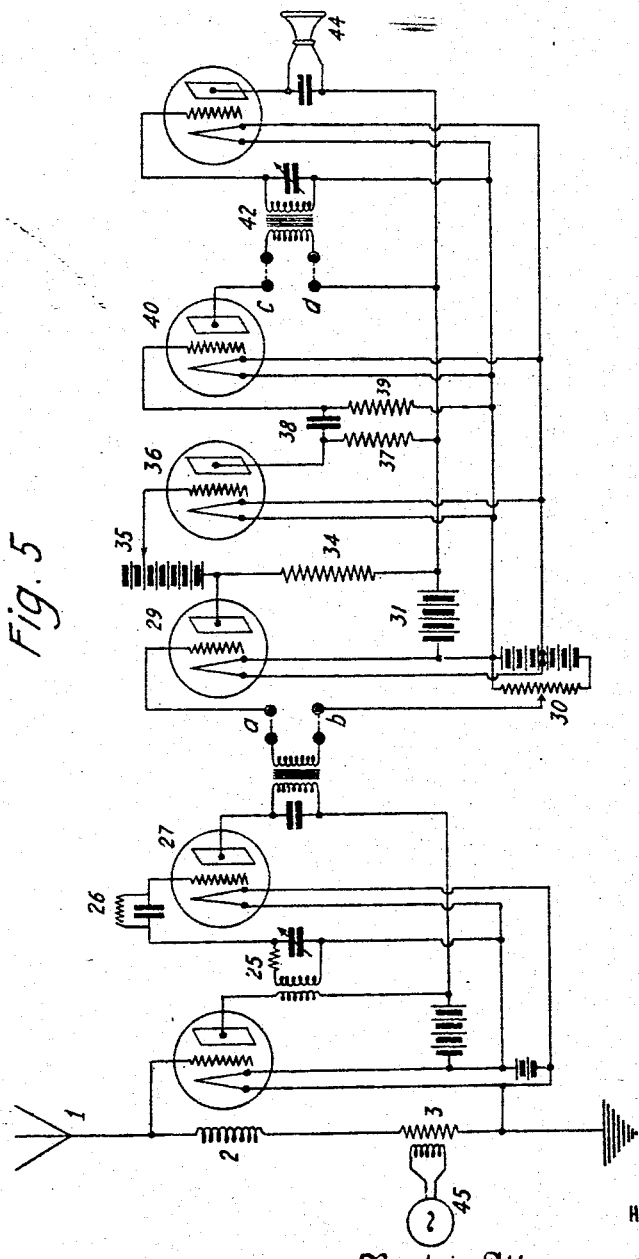
Fig. 5 is a diagrammatic representation of the circuit arrangement of a modified form of radio receiving apparatus.

The limiting arrangement is shown in Fig. 2 separately, and in Figs. 3 and 4 in combination with the receiver circuits. The arrangement comprises two three-electrode tubes (4 and 11) separately regulated in a manner to operate at a point of inflection M (Fig. 1) of their characteristics. This is attained by choosing a suitable plate potential and by regulating the heating of the filaments by means of rheostats (5 and 12), and the mean potentials of the grid by means of connections (6 and 8). The grid of the first tube (4) is also subjected to the oscillating potential difference of the antenna. The grid of tube (11) is connected with the plate of tube (4) through a resistance (7) and a conductor comprising a current source (8) of suitable potential. In this manner, the potential of the grid of tube (11) is a linear function of the plate current of tube (4), instead of being a function of the first or second derivative of this current as in the case with the usual circuit arrangements.

The plate of tube (11) transmits oscillations of limited amplitude to the additional circuits. The operation is as follows:

When the amplitude of the potential applied to the grid of tube (4) increases, the plate current of tube (4) $i_o$ increases up to the limiting value $i_1$. The potential of the plate (4) decreases then as a result of the drop produced in the resistance (7) by the increase of the current $i$, and reaches a minimum limiting value when $i=i_1$. Inversely, when the amplitude of the potential applied to the grid of tube (4) decreases, the plate current of this tube will regularly diminish because the characteristic has a rectilinear form (Fig. 1). The grid potential of tube (11) will therefore increase but the plate current of tube (11) cannot exceed the value $i_1$. Thus, the variations of the plate current of tube (11) have a limited amplitude in both senses, as well in case the potential applied to the grid of tube (4) increases as in case it decreases.

In order to utilize the limiting arrangement in a manner to avoid the disadvantages mentioned at the outset, it must preferably be preceded by aperiodic circuits or at least circuits that are considerably damped and it must be followed by highly tuned amplifiers. This arrangement is exactly the opposite of the one in use with ordinary circuits.

Fig. 3 shows an open antenna (1) which is damped by means of a resistance (3) directly controlling the limiting arrangement. The latter in turn energizes a resonator (13) which is tuned to the wave to be received and constructed in such a manner that its decrement is as small as possible. This resonator actuates a detector (14, 15) and the indicating apparatus (16) in the usual manner, either directly, or through the agency of other resonators not shown in the drawing and tuned either to the frequency of the electro-magnetic waves or to their modulation or beat period.

Fig. 4 shows a closed frame (2) which is considerably damped. It actuates the limiting arrangement through the agency of a multi stage-amplifier also considerably damped and comprising in the present case, iron core transformers (21, 23) and adjustable secondary windings. The total amplification reaches a value that permits the disturbances to attain the amplitude that is necessary for clearing the elbow of the characteristic curve of the limiting arrangement. The limiting arrangement actuates in turn the high and low frequency resonators, the detector and the indicating apparatus which have no special features.

A local generator of anodiary oscillations 19 is inductively coupled to the resonator 13 for making the reception of continuous waves possible by the heterodyne method.

The advantages of this arrangement may be explained as follows:

In the highly damped circuits which precede the limiting arrangement, the duration of the disturbances is very short. This decreases the interference in the reading and registering apparatus. Furthermore, the suppression of the resonance phenomena and of the accompanying amplification, reduces the amplitude of the signal and makes possible a more sensitive tuning of the limiting arrangement.

The highly syntonized resonators located beyond the limiting arrangement complete the results obtainable by this apparatus. By means of the well known resonance mechanism, the amplitude of the signal is then considerably increased with respect to that of the disturbances. In this manner, if the relation between the maximum amplitude permitted by the limiting arrangement and the amplitude of the oscillations to be received at the incoming end of this apparatus is designated by $x$ and the amplification caused by the succeeding resonators by $y$, it is sufficient that the relation of $\frac{y}{x}$ be superior to unity, for the disturbances at the terminals of the indicating apparatus (16) under no conditions reach an amplitude superior to that of the signal. Furthermore, the syntonized resonators such as (13) perform the function of a fly-wheel located between the limiting arrangement and the indicator. Under the control of a disturbance, the limiting arrangement is desensitized. It will limit the amplitude of the disturbing oscillations but will also completely arrest the transmission of a signal. The effect of these interruptions is attenuated and regulated by slightly damped circuits (13). The presence of resonators (13) and the point chosen for the action of the heterodyne (19) make possible that, the action of this apparatus be rendered as strong as is necessary for densensitizing the limiting arrangement.

Further adjustments are advisable for properly constituting a receiver in accordance with these principles. It is well known that, increase of the syntony and of the number of succeeding associated resonators increases the total time constant of the receiver and might cause the sticking together of the signals. In other words, the total resonance cannot exceed a certain maximum value, the amount of which is inversely proportioned to the wave length and the sending speed.

If all the disturbances were of an atmospheric origin, in accordance with the above description, it would be advisable to obtain this maximum resonance exclusively with the aid of resonators placed after the limiting arrangement, the preceding circuits of this arrangement being aperiodic. However, the grinders produced by powerful signals, etc. would render such an arrangement unsatisfactory. As a matter of fact, these grinders might cause the continuous operation of the limiting arrangement and might permanently desensitize the receiver. It is advisable, therefore, that the limiting arrangement be preceeded by resonators which have a maximum selective effect on the continuous grinders and a similar effect on the aperiodic disturbances. The limiting arrangement should be followed by resonators having the opposite properties.

If the circuits are examined from this special point of view, the following arrangement is found necessary:

To place ahead of the limiting arrangement a sufficient number of tuned resonators, each resonator being considerably damped. For example, the use of three circuits, each having a decrement equal to 0.5 would give from the standpoint of the grinders a selection identical with that which would be obtained from a single resonator having a decrement equal to 0.012, but would be preferable from the standpoint of the limiting operation.

To place after the limiting arrangement a few resonators which are individually highly syntonized.

The modification shown in Figs. 5 to 8 relates particularly to receiving signals having a modulated amplitude at the sending station, or at the receiving station, for example, by means of a heterodyne.

The arrangement comprises the following (Fig. 5); antenna (1, 2, 3) which may be open or closed and a series of considerably damped resonators (a single one, 25 is shown). The number of these resonators, however, must be sufficient to protect the valve against accidental operation caused by grinders of the other stations (conditions of syntony), and to increase the potential of the disturbance to the value necessary for the functioning of the valve (condition of amplification).

The detector (26, 27) transforms the high frequency oscillations into low frequency oscillations the period of which is that of the modulation.

The limiting valve composed of two tubes (29 and 36) operates in the immediate neighborhood of the bend of their characteristic curves and is provided with circuits similar to the ones of the applications mentioned. The tube (40) associated with the above by means of the well known connection (38, 39) is a simple relay.

A resonator 42 tuned to the period of modulation and having a time constant as high as the speed of sending permits is energized by the tube relay (40). For the receiving of continuous waves, the antenna is energized by the heterodyn (45) having a sufficiently loose coupling so that the amplitude of modulations can never be beyond the potential limit permitted by the valve. This arrangement completes the syntony produced by the high frequency resonator and prevents all accidental functioning of the valve that might be caused by strong grinders.

The indicating means (44) may be of any well known type.

The utilization and the operation of this circuit arrangement will more clearly appear from the following description.

Calculations show that if there were no valve, the relation between the potential amplitude attained in the last resonator under the control of a wave signal $S.\sin wt$, and a disturbance $P.e{-}at$ will be at least equal to $$\frac{SNT_2}{PV_2T_1} = Xmax$$

In this $V_2$ is the decrement of the resonator (22). $T_2$ the period of modulation, $T_1$ the period of the waves to be received, and Xmax the coefficient of resonance defined previously. It should be noted that the damping of the high frequency resonators is not taken into consideration in the above expression. This is easily explained. On one hand, in effect the modification of this damping is without influence on the relation that exists after the detector 27, between the amplitude that has been attained by the signal and the quantity of electricity generated by the disturbance. On the other hand, the amplitude attained in the low frequency resonator (42) is in proportion with the signal as well as with the disturbing electricity. The latter manifests itself as a ballistic shock as a result of the ratio (e. g. of the order of 100) that exists between the time constants of the low frequency resonators and the time constants of the highly damped high frequency resonators. The valve decreases the quantity of disturbing electricity to an extent that is the ratio equal to $$\frac{dap_1be}{dp_2e}$$

Figure 6:
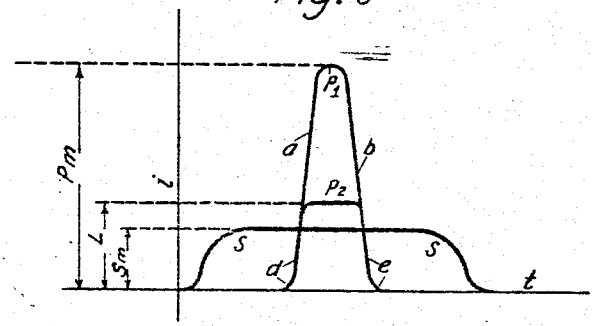
Fig. 6 illustrates graphically the relative amplitudes of the signal energy and of the disturbance before and after the action of the current limiting arrangement.

(Fig. 6). In this figure, the time is indicated on the abscissa and the amplitudes on the ordinate. The curve S represents the signal after rectification, the curve P¹ the amplitude after rectification but before limitation, the curve $p_2$ the disturbance reduced to a lesser amplitude by means of the limiting arrangement which permits at the most the passage of an amplitude within the limit L. From the above it may be readily deduced that the relation of the amplitudes becomes definitely equal to $$\frac{\text{amplitude of the signal current}}{\text{amplitude of disturbing train}} = \frac{S \cdot X\max}{P} \cdot \frac{\text{Area } dap_1be}{\text{Area } dp_2e}.$$

This relation must be as high as possible. As above stated, the maximum that is permitted for $x_m$ depends on the product of the wave length and sending speed and may be readily attained by increasing $T_2$, i. e. as above stated the time constant of the resonators which follows the valve. With respect to the expression $$\frac{dap_1be}{dp_2e}$$

it may be shown that it depends entirely on and is varied in the same sense as the relation $\frac{Pm}{L}$ (Fig. 6) between the elongation Pm of the disturbance and the maximum amplitude L which is transmissible by the latter. On the other hand, L is at least equal to the amplitude Sm that is attained by the signal when it enters the valve. Therefore $\frac{Pm}{Sm}$ must be made as small as possible. This is the very thing looked for and obtained, by reducing the attenuation, i. e. by obtaining the syntony that is necessary in the valve, by means of a sufficient number of highly damped resonators instead of one or two syntonized resonators as is the case in the usual circuit arrangement. This explanation shows that the effective height of the receiving antenna and the amplification must be sufficient for increasing the amplitude of the signal as soon as possible to the operating condition of the valve.

In conclusion it may be stated that, by means of these new arrangements the two inherent defects of all limiting arrangements have been reduced. On one hand, the limiting action of the arrangement on an isolated disturbance has been increased, and on the other hand, the duration of each disturbance being considerably decreased, the interruptions in the sensitiveness of the receiver are also considerably shortened.

Figure 7:
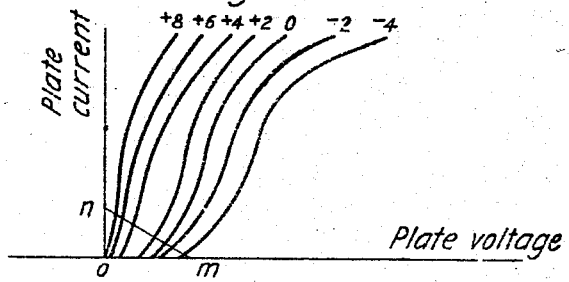
Figs. 7 and 8 are graphic illustrations for facilitating the explanation of the principles of the invention.
Figure 8:
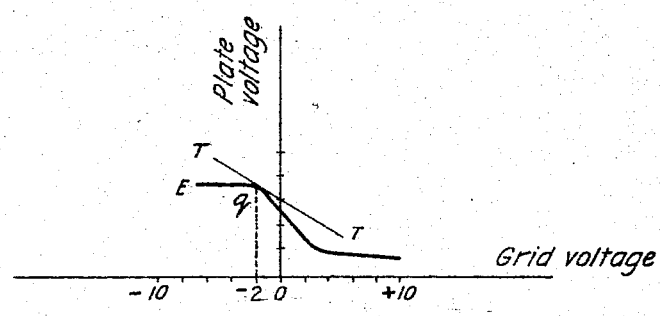

Figs. 7 and 8 show the arrangement for tuning the tubes 29, 36 (Fig. 8). Figure 7 shows a set of curves each of which indicates for a certain grid potential the plate current $i$ for the plate voltage. As a result of the potential drop in the resistances 34, 37, (Fig. 5), the potential and the plate current are connected by an expression represented by straight line $mn$, the abscissa $om$ of which is equal to the electromotive force E of the source 31 (Fig. 5), and the ordinate to $\frac{E}{R}$.

The functioning point $q$ which corresponds to a given grid voltage (— 2 volts, for instance) is at the intersection of the straight line $mn$ and the static characteristic corresponding to this voltage. In Figure 8 one may trace in dotted lines the characteristic which connects the grid and plate voltages of the valves. The limiting effect is evident. The maximum ordinate of this new curve could not exceed the value E. In order to obtain a sufficient sensitiveness from the point of functioning $q$ near the elbow, measured by the inclination of the tangent TT, (Fig. 8) it is necessary that the plate resistance (34, 37 Fig. 5) be given a value R considerably superior to the one used in ordinary amplifiers. The potentiometers (30 and 35 Fig. 5) permit the adjustment of the initial potential of the grids to the immediate neighborhood $q$ of the limiting point.

Having described my invention, what I claim is:

1. In receiving apparatus for eliminating disturbances, the combination of a damped receiving circuit, a current limiting device for receiving the output of said receiving circuit, said device comprising a highly damped resonator for eliminating grinders, and a highly resonant circuit for receiving the output of said current limiting device.

2. In receiving apparatus for eliminating disturbances, the combination of a damped receiving circuit, a current limiting device for receiving the output of said receiving circuit, said device comprising individually highly damped resonators of a number sufficient to protect the device against the permanent action of grinders, a highly resonant circuit for receiving the output of said current limiting device, and a detector and an indicator associated with the last-mentioned circuit.

3. In receiving apparatus for eliminating disturbances, the combination of a highly damped antenna, a highly damped resonant receiving circuit connected to the antenna, a current limiting device for receiving the output of said receiving circuit and a highly resonant circuit for receiving the output of said current limiting device.

4. In receiving apparatus for eliminating disturbances, the combination of a plurality of highly damped resonant receiving circuits having a maximum selective effect on the continuous grinders, a current limiting device for receiving the output of said receiving circuits and a highly resonant circuit tuned to the incoming signal for receiving the output of said current limiting device.

5. In receiving apparatus for eliminating disturbances, the combination of a highly damped antenna, a highly damped resonant receiving circuit connected to the antenna, an amplifier in said receiving circuit, a current limiting device for receiving the output of said receiving means, a highly resonant circuit for receiving the output of said current limiting device, and an amplifier associated with said resonant circuit.

6. The method of eliminating disturbances in radio receiving circuits which consists in amplifying the received signals to a given value in successive stages each having high damping, eliminating disturbances greater than the said given value of said amplified signals, and resonating the resulting signals without substantial damping.

HENRI JEAN JOSEPH MARIE DE REGNAULD DE BELLESCIZE.